July 7, 1953    R. A. McCALLUM    2,644,482
FLUID FLOW REGULATOR
Filed Nov. 13, 1944    2 Sheets-Sheet 1

Inventor:
Robert A. McCallum
by
Louis A. Maxson
Atty.

Patented July 7, 1953

2,644,482

UNITED STATES PATENT OFFICE 2,644,482

FLUID FLOW REGULATOR

Robert Anthony McCallum, Michigan City, Ind., assignor to Joy Manufacturing Company, a corporation of Pennsylvania Application November 13, 1944, Serial No. 563,253

24 Claims. (Cl. 137—501)

My invention relates to apparatus for regulating the flow of compressible fluids, and more particularly to apparatus for regulating the flow of compressible fluids so as to maintain a substantially constant veocity in the supply line in spite of moderate variations in the pressures or densities of the fluid in the supply line.

In most motors which use fluid as an operating means, as for example an air motor or internal combustion engine, the speed of the motor, when operating at a given altitude, will be determined by the volume of fluid admitted to the motor per unit of time. If it is desired to regulate the speed of the motor this can be done by regulating the volume of fluid admitted to the motor per unit of time. In the past, means have been available for accurately regulating the flow of non-compressible fluids. The present invention relates particularly to means for controlling the flow of compressible fluids so as to maintain a reasonably constant volume of flow in spite of variations in pressure and density.

The common means of measuring fluid velocity are an orifice, a Pitot tube and a venturi. Each of these gives a pressure differential ($\Delta p$) which is proportional to the square of the velocity times the density.

(1) $$\Delta p = K V^2 d$$

Where the density of a fluid is constant, it is obvious that in order to maintain a constant velocity of flow (V) it is only necessary to maintain $\Delta p$ constant. This can be done by a pressure sensitive device such as a piston or diaphragm working against a spring or weight. However, in order to maintain a constant velocity when the density of the fluid varies, it is necessary that $\Delta p$ be made to vary in proportion to the density. Transposing Formula 1 above, we find that (2) $$\frac{\Delta p}{d} = K V^2$$

From this it will be seen that, in order to hold the velocity (V) constant, it is necessary to hold $$\frac{\Delta p}{d}$$

constant. Within the range of temperatures normally encountered, it may be considered that the density is directly proportional to the absolute pressure. Therefore, by changing the constant it is possible to substitute absolute pressure for density. In other words, a constant velocity may be maintained by maintaining $$\frac{\Delta P}{P_{abs}}$$

a constant.

My invention accomplishes this result in a preferred embodiment thereof by the provision of two mutually oppositely acting surfaces of unequal areas cooperating through their mutual opposition in operating a control valve. The smaller of these areas is subjected to the absolute pressure in the supply line delivering fluid for admission to the motor or other device which it is desired to control, while the larger of these areas is subjected to a pressure equal to the absolute pressure just mentioned minus the pressure drop across an orifice, a Pitot tube or a venturi. The differential in areas is created by means which either does not introduce any uncounterbalanced effect resulting from atmospheric pressure, or which wholly or at least substantially avoids the introduction of effects resulting from the subjection of surfaces, during periods of flow regulation, to atmospheric pressure.

An object of my invention is to provide an improved means for regulating the flow of a compressible fluid so as to maintain a substantially constant volume of flow. Another object of my invention is to provide an improved means for regulating the flow of a compressible fluid to a motor so as to maintain substantially constant the speed of a fluid motor. A further object of my invention is to provide an improved means for regulating the flow of a compressible fluid by balancing the forces produced on appropriate areas by the action of absolute pressures differing by the pressure drop through an orifice, a Pitot tube or a venturi. A still further object of my invention is to provide improved means for controlling the flow of a compressible fluid incorporating two different effective areas, one actuated by the absolute pressure of the fluid and the other actuated by the absolute pressure less a pressure drop produced as above, the forces so produced balancing one another in such manner as to control a regulating valve and thereby to maintain a substantially constant volume of flow. Still a further object of my invention is to provide improved means for controlling the flow of a compressible fluid comprising means for effecting a pressure drop varying with the velocity of flow and means for subjecting unequal oppositely acting areas to the absolute pressure at one point in the moving stream of fluid and to the absolute pressure at another point in said moving stream where a pressure drop occurs, and means for varying the pressure drop at will. Yet another object of my invention is to provide for a valve device which is operative to control the flow of a compressible fluid, improved means for regulating automatically said valve device so as to maintain a constant volume of flow regardless of variations in pressure and density. Still another object of my invention is to provide improved control means for a valve which regulates the flow of a compressible fluid, said control means including an orifice or venturi through which the fluid flows, an element having unequal opposite areas subjected to the pressures at opposite sides of the orifice or venturi, said element also having an area subjected to atmospheric pressure, and means for counterbalancing the effect of atmospheric pressure on said element. Other objects and advantages of my invention will hereinafter more fully appear.

In the accompanying drawings, in which for purposes of illustration two diagrammatic illustrations and two working embodiments of my invention have been shown for purposes of illustration.

Figures 1, 2:
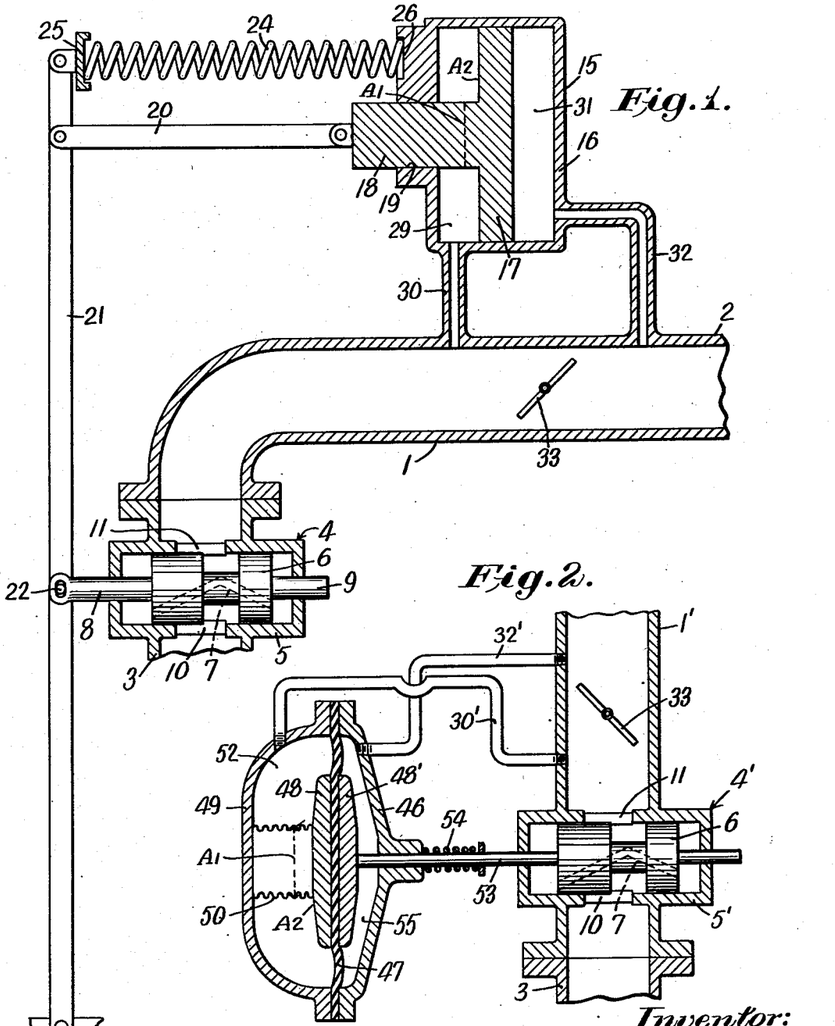
Fig. 1 is a diagrammatic view for the purpose of illustrating the working principles of my invention from one aspect thereof.
Fig. 2 is another diagrammatic view for the purpose of illustrating the working principles of my invention in another embodiment.

Referring first to Fig. 1, a pipe line 1 is adapted to be connected at one end thereof at 2 to the supply space of a fluid operated motor. Gaseous fluid is supplied to the pipe 1 from a connection 3 leading from a source of a gaseous operating fluid, and flow from the line 3 is controlled by a balanced valve device 4 comprising a valve casing 5 in which a balanced piston valve 6 is reciprocable, the spaces at the opposite ends of said piston valve 6 being connected by a port 7 extending through the piston valve. The piston valve has an operating rod 8 and a counterbalancing rod 9 so that it is substantially completely balanced, and it controls the flow through the casing 5 into which fluid passes from the line 3 through a port 10 and from which fluid passes to the pipe 1 through a port 11.

For the purpose of controlling the position of the valve 6 and regulating the amount of fluid delivered to the motor through the line 1, I have provided a differential piston mechanism 15 herein diagrammatically illustrated and comprising a casing 16 in which a differential piston 17 is mounted. The piston has a projecting portion 18 of substantial cross-sectional area extending through an opening 19 in one wall of the casing 16. By reason of the presence of this portion 18 there are provided at the opposite sides of the piston 17 unequal areas. Let the cross-sectional area of the portion 18 be designated by $A_1$ and the annular area at the left end face of the piston 17 as $A_2$. The area at the right hand end of the piston 17 will then equal $A_1+A_2$. The projecting portion 18 is connected by a link 20 and a lever mechanism 21 with the piston valve operating rod 8 at 22, the lower end of the lever being pivotally supported at 23. A spring 24 acts between an abutment 25 carried at the upper end of the lever 21 and an abutment surface 26 on the valve casing 16, and is adapted to exert a pressure on the lever sufficient to counterbalance the force which would be exerted by atmospheric pressure acting toward the right on the area $A_1$ with zero pressure at the opposite side of the area $A_1$. In other words, the spring 24 and its connection with the lever 21 block out, as it were, entirely the effect of atmospheric pressure on the portion 18 and make it mathematically correct to consider the pressures acting on the area $A_2$ on the left hand end of the piston 17 and the pressures acting on the area at the right hand end of the piston 17 (equal to the cumulative areas $A_1+A_2$) as subjected to absolute pressures. The space 29 to the left of the piston 17 is connected by a connection 30 with the conduit 1, and the space 31 at the right hand side of the piston 17 is connected by a conduit 32 to the line 1 at a point nearer the motor. Any suitable device for causing a pressure drop varying with the flow through the pipe 1 may be provided, and I have illustrated this by the manually adjustable valve 33. It will be understood that a Pitot tube arrangement, a venturi or an orifice could be substituted. Of course the effect of the valve is that of a variable orifice.

The principle of operation of the diagrammatically illustrated embodiment of the invention of Fig. 1 may now be readily understood. The pressure drop between the point at which the conduit 30 opens into the line 1 and the point at which the conduit 32 opens into the line 1 where the pressure drop is measured, is $\Delta p = K_1 V^2 d$ where $\Delta p$=the drop; $K_1$ a constant, V velocity; and $d$ density of the air in the throat or at the motor side of the orifice. Now neglecting temperature variation $d = K_2 P$; where $K_2$ is another constant and P is the absolute pressure at the point where conduit 32 enters the line 1. Substituting, we find that $\Delta p = K_1 K_2 V^2 P$ or $$\frac{\Delta p}{P} = K_1 K_2 V^2$$

Therefore, if $$\frac{\Delta p}{P}$$

is held constant, V will also be constant, and the speed of the motor to which fluid is supplied at 2 will be constant.

It will be understood, as above indicated, that an evacuated chamber (this is shown in Fig. 2) may be used to eliminate the effect of atmospheric pressure on the area which constitutes the differential between the areas of the opposite sides of the piston 17.

Now, it will be noted that there is a force acting toward the left equal to $(A_1+A_2)P$. There is also a pressure acting to the right equal to $A_2(P+\Delta P)$. If the force towards the left exceeds the force towards the right the piston valve 6 will move in an opening direction and increase the flow to the conduit 1 and increase the differential in pressure $\Delta P$. This will result in movement of the piston 17 to the right and a partial closing of the valve 6. Conversely, if the force acting toward the right on the link 20 were the greater, the valve 6 would partially close, $\Delta P$ would be reduced, and the force provided by the pressure acting in the chamber 31 would move the piston 17 toward the left and thereby tend to open the valve 6 further. Thus, in whichever direction movement of the piston 17 takes place, there will be always a tendency to bring things to a balanced condition. Under such balanced conditions $(A_1+A_2)P = A_2(P+\Delta P)$. Transposing, $A_1P+A_2P = A_2P+A_2\Delta P$, and $A_1P = A_2\Delta P$ and $$\frac{A_1}{A_2} = \frac{\Delta P}{P}$$

Since $A_1$ and $A_2$ are fixed areas $$\frac{A_1}{A_2}$$

is a constant, and therefore $$\frac{\Delta P}{P}$$

will also be held constant. It will be evident from what has been said that if $$\frac{\Delta P}{P}$$

is held constant, then V, the velocity in the throat of the orifice, will also be constant, and if this orifice is fixed and there is no pressure drop between the orifice and the motor (which can be avoided by locating the motor very close to the point where 32 enters the conduit 1) then the displacement of the motor and the speed of the motor must also be constant, and the purpose of this mechanism, to wit, to hold the speed constant, will be realized.

If the orifice is fixed at a different opening, that is, if the valve 33 which diagrammatically illustrates a variable area orifice has its adjustment changed, the velocity in the throat, which is the velocity of the fluid which actuates the motor, will remain the same, but the volume of fluid and the displacement will stabilize at a different point, thus governing the motor at a different speed. And therefore by changing the orifice setting (the setting of the valve 33) it will be possible to govern the motor at any speed within its normal running range. It is within the contemplation of my invention that the valve 33 not only constitutes a device for adjusting the orifice size, but also a device movable wholly to interrupt the flow of motive fluid to the motor and thus to act as a stop valve.

There are many applications where an absolutely constant speed is not desired. It is well known, for example, that the control of a motor is more stable if the control allows the motor to slow down somewhat under increased load and vice versa. Such an effect can be introduced by increasing the yielding force acting on the lever 21 until it is more than sufficient to counterbalance the force exerted by atmospheric pressure on the area $A_1$ while a zero pressure exists at the opposite side of this area. The increased yielding force may be obtained by replacing the spring 24 with a spring of greater strength, by providing adjustable abutment means for the spring 24, or by providing another yielding means acting with the spring 24. Assuming that the spring 24 is replaced with a spring having a strength greater than that needed to balance the atmospheric pressure on the area $A_1$ by an amount F, the balance on the piston 17 under this condition is $$A_2(P+\Delta P) = (A_1+A_2)P + F$$
$$A_2 P + A_2 \Delta P = A_1 P + A_2 P + F$$
$$\frac{\Delta P}{P} = \frac{A_1}{A_2} + \frac{F}{PA_2}$$

As the load on the motor increases, P must also increase and $$\frac{F}{PA_2}$$

decreases. Thus $$\frac{\Delta P}{P}$$

decreases as also does the fluid velocity and the speed of the motor. If F varies with the position of the supply valve and becomes less as the valve is opened, this also tends to slow down the motor with increased load. These modifications and others which may be desirable for special applications do not in any way depart from the spirit of the invention.

Referring next to Fig. 2, the mode of operation of this diagrammatic illustration of my invention will be readily understood. In this figure there is substituted for the casing 16 a diaphragm casing 46 which is divided into two chambers by a flexible partition 47. The central portion of the partition is made rigid by opposite plate elements 48, 48'. Between the plate 48 and the wall 49 of the side of the casing 46 more remote from the valve mechanism 4', there is arranged an evacuated bellows 50, this being fastened to the wall 49 and to the plate 48 so that the pressure in the chamber 52 at the left hand side of the diaphragm 47 can act only on the portion of the diaphragm 47 and plate 48 outside the bellows 50. We may consider the effective cross-sectional area of the bellows 50 to correspond to the area $A_1$ of the structure of Fig. 1, and that the annular area surrounding the effective circumference of the bellows 50 corresponds to $A_2$ in Fig. 1. The area at the right hand side of the bellows 47 is substantially equal to $A_1+A_2$, the diameter of the operating rod 53 being kept so small as to be negligible. If it be desired to compensate for the cross-sectional area of this rod a very light spring 54 may be applied to it, but this is unimportant with the area of the rod made sufficiently small. The connection of the chamber 52 is at the approach side to the adjustable orifice provided by the valve device 33, and the connection of the space 55 at the right of the diaphragm 47 is with the conduit 1' beyond the adjustable orifice 33. It is unnecessary to describe the mode of operation of this embodiment of the invention in detail, as it does not differ in basic principle from the mode of operation of the structure of Fig. 1, the evacuated bellows 50 simply taking the place of the spring 24 and of the reduced portion 18, the evacuation of the bellows making unnecessary the provision of the spring. Because of the small size of the rod 53, it need not affect practically the equation applicable to the first illustrated form of the invention, and the spring 54 is entirely unnecessary, for example, with a one-eighth inch rod, for this spring would then have to exert a force of less than one-fifth of a pound. Also, since the pressure differential $\Delta P$ will be relatively small, the fact that the cross-sectional area of the rod is subtracted from $A_1+A_2$ will be most negligible.

Figures 3, 4, 4A, 5:
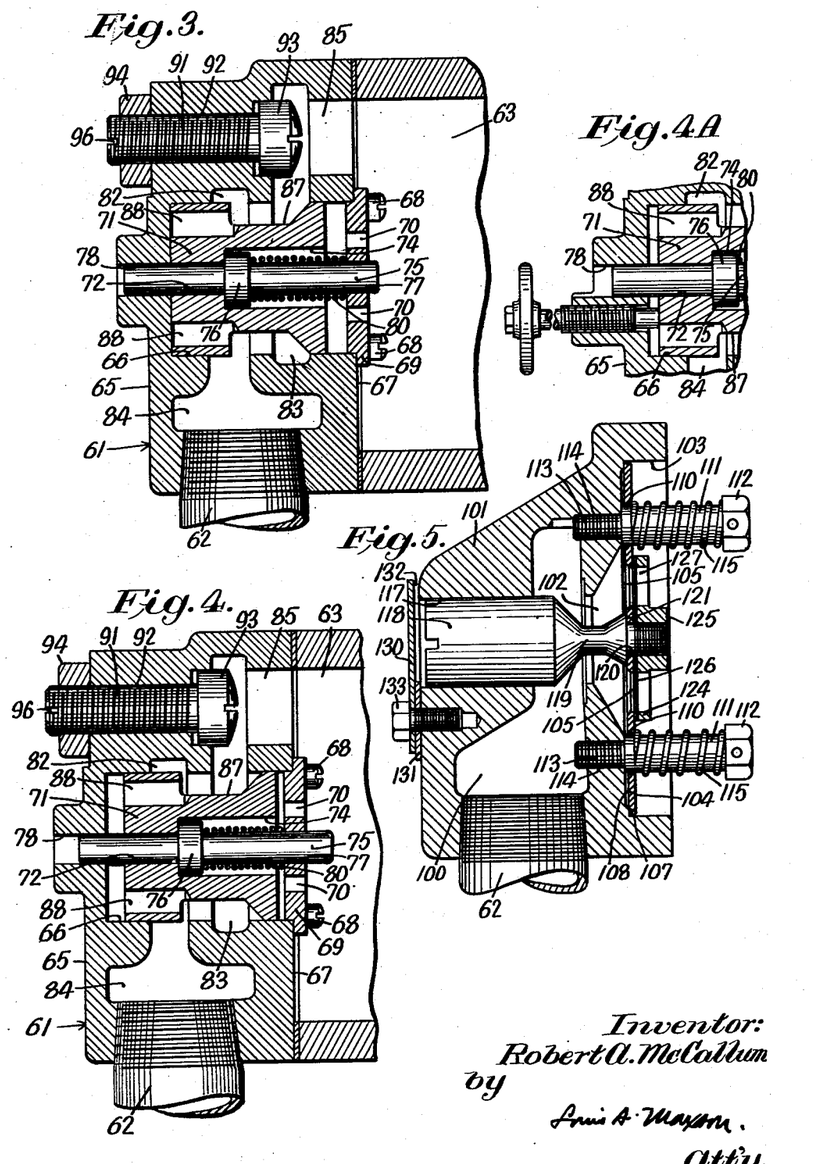
Fig. 3 is a sectional view of a fluid flow regulating device constructed in accordance with one illustrative form of my invention.
Fig. 4 is a sectional view similar to Fig. 3, but showing parts in different positions.
Fig. 4A is a fragmentary view, showing a modification.
Fig. 5 is a sectional view showing another embodiment of the invention.

Turning now to the more fully developed embodiments of the invention illustrated on the second sheet of the drawings, the structure of Figs. 3 and 4 may be noted. Here it will be observed that a fluid flow regulating device generally designated 61 is connected between a conduit 62 leading from a source of a gaseous fluid supply not shown, and a chamber 63, which may be a fluid supply line, or may be the main supply connection to a motor not shown. The regulating device 61 includes a block 65 having a bore 66 which opens through a surface 67 of the block, which surface forms a boundary for chamber or line 63. Attached to the block, as by screws 68, is a plate 69 covering the open end of the bore 66. The plate 69 is traversed by openings 70 so that the right hand end of the bore 66 and the space to the right of the surface 67 are in communication with each other freely. Reciprocable within the bore 66 is a piston-type valve member 71 having stepped bores 72 and 74 extending axially therethrough. A rod 75 extends through the bores 72 and 74 and has an enlarged portion 76 received within the larger bore 74, and the end portions of the rod are reciprocably guided in bores 77 and 78 extending respectively through the plate 69 and the left hand end of the block 65 at the inner end of the bore 66. A spring 80 acts between the plate 69 and the enlarged portion 76 for pressing the latter against the shoulder at the junction of the bores 72 and 74 and thereby urges the piston 71 toward the inner (left hand) end of the bore 66. The strength of the spring 80 and its special functions will be later more fully described. Formed in the block 65 surrounding the bore 66 are longitudinally spaced, annular grooves 82 and 83. Passage means 84 connects the groove 82 in communication with the conduit 62, and passage means 85 connects the groove 83 in communication with the conduit 63. The piston 71 has formed in its periphery an annular groove 87 which is adapted to connect the grooves 82 and 83 in communication with each other when the piston is adjacent the inner end of the bore 66, and as the piston moves toward the right in the bore the communication between the grooves is restricted; and if the piston were to be moved to the extreme right hand end of the bore, communication would be cut off entirely. Extending longitudinally through the piston and opening into the groove 87 are passages 88, opening through the left hand end of the piston into the bore 66. Extending towards the passage 85 and designed more or less to obstruct the latter, depending upon its adjustment, is an adjustable means, herein shown in the form of a bolt 91. This bolt is threaded into an opening 92 in the block 65, and has its head 93 adapted to be moved toward or from the passage 85 to control the effective flow area at the mouth of the passage 85. Threaded on the outer end of the bolt is a nut 94 engageable with the block 65 for locking the bolt in its different adjusted positions. Formed in the outer end of the bolt is a slot 96 in which a screw driver blade may be received for the adjustment of the bolt.

The operation of the regulating device 61 will be clearly apparent from the description given; and its similarities to the diagrammatically illustrated structure of Fig. 1 may be readily appreciated. The cross sectional area of the portion of the rod 75 which extends into the opening 78 corresponds to the area $A_1$. The area $A_2$ is equal to the area of the annulus between the periphery of the rod portion mentioned and the wall of the bore 66. The effective area at the right hand end of the valve 71, including the right hand end of the rod 75 and the area of the portions of the end of the valve facing to the right within the bore 66 equals $A_1+A_2$. 93 corresponds to 33, and the space in the passage 85, beyond the bolt head 93, and the space 63 correspond to the point of connection of the conduit 32 with the conduit 1, while 70 and the communication with the right hand end of the rod 75 correspond to 32. The space 84 and the space within the chamber 66 on the supply side of the bolt head 93 correspond to the space in conduit 1 ahead of valve 33, while 88 corresponds generally to 30, through a portion of the area on which the pressure acts towards the right is not at the left hand end of the valve. The strength of the spring 80 is such as to neutralize the effect of atmospheric pressure on the exposed end of the plunger or rod 75.

Fluid delivered to the groove 82 from the conduit 62 will be conducted through the groove 87 in the piston 71 and the passage 85 to the fluid supply line or motor inlet 63. There will be a drop in the fluid pressure between the groove 87 and the space 63, this drop depending on the degree of obstruction to the flow of air determined by the position of the bolt head 93 and the absolute pressure of the fluid. The left hand end of the piston 71 and other areas cumulating with such end equals the area of an annulus which is equal to the cross section of 66 minus the cross section of 72, and this area will be subjected to the pressure in the groove 87 through the passages 88. The right hand end of the piston will be subjected to the pressure in the supply line 63 through the passages 70, while the end of the plunger 75 will be directly subjected to the pressure in the space 63. This device will operate then precisely as explained in connection with Fig. 1. If there is a tendency for an increased quantity of fluid to flow past the screw 93, there will be a greater reduction in the absolute pressure acting to move the piston 71 to the left than there is in the absolute pressure acting to move the piston 71 to the right, and so the piston 71 will move to the right and reduce the flow of gaseous pressure to the space 63. If there is a tendency for the quantity of fluid flowing past the flow controlling screw 93 to be diminished, then the pressures at the right and left hand ends of the piston 71 will be more nearly equalized, and the piston 71 will move toward the left, increasing the volume of fluid delivered. In Fig. 4A there is shown a modification in which a hand turned threaded stem in provided for moving the valve 71 to closed position when this is desired, thus enabling the automatic control valve also to constitute a stop or throttle valve. It will be noted that spring 80 always tends to open valve 71.

In the form of the invention shown in Fig. 5, a conduit 62 opens into a chamber 100 formed in a block 101, the chamber acting as a fluid supply space. A discharge passage 102 connects the chamber 100 in communication with an enlarged circular recess 103 in a face of the block and which is adapted to form a portion of a motor supply chamber supply line, or the like. Hereafter, 103 will simply be referred to as the space 103.

Arranged in the space 103 and overlying the discharge end of passage 102 is a valve plate 104 having openings 105 formed therein. At the inner end of the space 103, and adjacent the periphery of the latter, there is a narrow shoulder 107, against which the plate 104 may seat, and yet have a shallow space 108 at its left hand side freely communicating with passage 102. The plate 104 has openings 110 extending through it, and through these openings cylindrical guides 111 extend. These guides have heads 112 at their right hand ends and threaded portions 113 at their left hand ends, the latter threadedly received in bores 114 formed in the block 101. Springs 115, whose characteristics will later be described, surround the portions 111 and engage the right hand side of the valve plate 104. Formed in the block in axial alinement with the passage 102 and of the same diameter as the latter at the left hand end thereof, is a bore 117 in which a plunger 118 is slidably received. This plunger is connected by a reduced portion 119, extending through the passage 102 and through an opening 120 in the valve 104, with the latter. The reduced portion 119 is shouldered between its ends, as at 121, and the shoulder engages the central portion of the plate 104. A plate member 125 has a hub portion 125 threaded on the reduced portion 119 to the right of the shoulder 121 and clamps, between it and the plate 104, a screen 126. The plate member 124 is provided with openings 127 which communicate with the openings 105 when it is in a position clamping the screen 126. Arranged at the left hand end of the bore 117 is a plate 130 which prevents the access of foreign material to the bore 117, and this plate is spaced from the block 101 by a plate 131 so as to provide a space 132 connecting the bore 117 in communication with the atmosphere. A bolt 133 clamps the plates 130 and 131 to the side of the block 101.

The analogy of this arrangement to the structure diagrammatically illustrated in Fig. 1 is somewhat less obvious, but will yet be readily appreciated. The function of the springs 115 is to neutralize the effect of atmospheric pressure on the left hand end of the plunger 118. The left hand end of the plunger is of the area $A_1$. The right side of the plate 104 has a net effective area equal to $A_1+A_2$. This is less than the overall area of a circle equal in diameter to the plate 104, because the holes 105 are present. The annular area on the left side of the plate 104, between a circle of slightly larger diameter than the plunger 118 and the periphery of the plate 104 is equal to $A_2$. We say a circle of slightly larger diameter than the plunger 118 because, again, of the presence of the holes 105. If there were provided holes of twice the cumulative area of those shown, the disc would be increased in diameter to compensate for the fact, but in all circumstances the plate 104 will have its size made such that it will have an effective area on its right side equal to $A_1+A_2$, and the effective (uncounterbalanced) area on its left side will be $A_2$. The clearance around the periphery of the valve plate 104 is sufficiently restricted to prevent substantial interference with the operation of the device through leakage through this annular space. When the differential in pressure between the left and right hand sides of the plate 104 increases, the plunger 118, the valve 104, etc. will move toward the right, obstructing the flow through the passage 102, and by the diminution in the quantity of fluid flowing the pressure differential will be diminished and the plate 104 will then tend to move again to the left, reopening the passage 102. When the quantity of fluid flowing tends to diminish, the differential in pressure between the opposite sides of the plate 104 will in turn diminish and the plunger 118 will move toward the left, increasing the flow. The provision of the screen reduces the effective area of the openings and consequently the velocity immediately adjacent to the openings. This reduces the possibility of the flow through the orifice being affected by extraneous conditions, such as the position of the valve.

As a result of my invention it will be observed that I have provided an improved device for regulating the flow of gaseous pressure fluids. It will be noted that the device operates automatically to regulate the flow of gaseous fluid in a manner to maintain the speed of a motor constant. It will be observed that means is also provided for controlling the operation of a motor so as to maintain the speed of the latter constant at any desired value. The device operates to maintain the speed of the motor constant irrespective of changes in pressure and density.

While I have in this application specifically described two diagrammatic embodiments, two more fully developed embodiments and a modification of one of the latter, it will be understood that these embodiments and the modification are shown for purposes of illustration and that the invention may be further modified and embodied in various other embodiments without departing from the spirit or the scope of the appended claims.

What I claim as new and desire to secure by Letters Patent is:

1. In a flow-regulating device, in combination, means forming a passage for conducting fluid having a supply end and a delivery end, means between said supply end and said delivery end for restricting flow and creating a differential in pressure between the upstream and downstream sides of said flow-restricting means, and a device for controlling the supply of fluid to the supply end of said passage including means forming a conduit leading to the supply end of said passage and an element having a portion movable relative to said conduit to vary the flow therethrough, said device having, for moving said element to vary the flow, an area facing in a direction to provide under the action of fluid pressure thereon a force tending to move said element to provide for increased flow past the same, a smaller area facing in a direction to provide under the action of fluid pressure thereon a force tending to move said element to diminish flow past the same, and means for effecting the subjection of said first mentioned area to the pressure at the downstream side of said flow-restricting means and for subjecting said smaller area to the pressure at the upstream side of said flow-restricting means, the ratio of said first mentioned area to said smaller area being the same as the ratio of the absolute pressure at the upstream side of said flow-restricting means to the absolute pressure at the downstream side of said flow-restricting means.

2. In a regulating device, in combination, means providing a passage for conducting pressure fluid, means for restricting the flow of fluid through said passage, means for supplying pressure fluid to said passage, a movable element having surfaces including oppositely directed unequal pressure areas, means for subjecting the smaller of said pressure areas to the absolute pressures at the intake end of said passage, means for subjecting the larger of said pressure areas to the absolute pressures at the discharge end of said passage, means for precluding the exertion on said element of any effective element-moving force by any other surface thereof including yielding means acting oppositely to the direction of movement of said element by the pressures acting on the smaller of said pressure areas, and valve means controlled by said element for regulating the flow of fluid through said fluid supply means.

3. In a flow-regulating device, in combination, means forming a passage for conducting fluid having a supply end and a delivery end, means between said supply end and said delivery end for restricting flow and creating a differential in pressure between the upstream and downstream sides of said flow-restricting means, and a device for controlling the supply of fluid to the supply end of said passage including means forming a conduit leading to the supply end of said passage and an element having a portion movable relative to said conduit to vary the flow therethrough, said device having, for moving said element to vary the flow past the latter, an area facing in a direction to provide under the action of fluid pressure thereon a force tending to move said element to provide for increased flow past the same, a smaller area facing in a direction to provide under the action of fluid pressure thereon a force tending to move said element to diminish flow past the same and a third area facing in said last mentioned direction and with said smaller area equalling said first mentioned area, said first mentioned area being subjected to the pressure at the downstream side of said flow-restricting means and said smaller area subjected to the pressure at the upstream side of said flow-restricting means, and means for precluding said third mentioned area from influencing the movement of said device.

4. In a regulating device, in combination, means providing a passage for conducting pressure fluid, means for restricting the flow of fluid through said passage, means for supplying pressure fluid to said passage, a movable element having oppositely directed unequal pressure areas, means for subjecting the smaller of said pressure areas to the absolute pressures at the intake end of said passage, means for subjecting the larger of said pressure areas to the absolute pressures at the discharge end of said passage, means associated with said movable element presenting an area equal to the difference between said opposed areas and facing in the same direction as the smaller one thereof, means precluding the exertion by fluid pressure on said area on said element equal to the difference between said opposed areas of any force augmenting the force exerted by fluid pressure acting on said smaller pressure area, and valve means controlled by said element for regulating the flow of fluid through said fluid supply means, said element connected with said valve means and operating on an increase in the pressure differential acting thereon to move said valve means toward its closed position and effect a reduction in the flow of fluid through said fluid supply means.

5. In a flow-regulating device, in combination, means forming a passage for conducting fluid having a supply end and a delivery end, means between said supply end and said delivery end for restricting flow and creating a differential in pressure between the upstream and downstream sides of said flow-restricting means, and a device for controlling the supply of fluid to the supply end of said passage including means forming a conduit leading to the supply end of said passage and an element having a portion movable relative to said conduit to vary the flow therethrough, said device having, for moving said element to vary the flow past the latter, an area facing in a direction to provide under the action of fluid pressure thereon a force tending to move said element to provide for increased flow past the same, a smaller area facing in a direction to provide under the action of fluid pressure thereon a force tending to move said element to diminish flow past the same and a third area facing in said last mentioned direction and with said smaller area equalling said first mentioned area, said first mentioned area subjected to the pressure at the downstream side of said flow-restricting means and said smaller area subjected to the pressure at the upstream side of said flow-restricting means, and means for precluding said third mentioned area from influencing the movement of said device, the ratio of said first mentioned area to said smaller area being substantially the same as the ratio of the absolute pressure at the upstream side of said flow-restricting means to the absolute pressure at the downstream side of said flow-restricting means.

6. In a regulating device, in combination, means providing a passage for conducting pressure fluid, manually adjustable means for restricting by varying amounts the flow of fluid through said passage, means for supplying pressure fluid to said passage, a movable element having oppositely directed unequal pressure areas, means for subjecting the smaller of said unequal areas to the absolute pressure at the upstream side of said flow-restricting means, means for subjecting the other of said unequal areas to the absolute pressure at the downstream side of said flow-restricting means, said areas bearing a ratio to each other equal but inverse to the absolute pressures which act upon them, and valve means controlled by said element for regulating the flow of fluid through said fluid supply means, said element having another area in fixed relation thereto facing in the same direction as the smaller of said pressure areas and subjected to a substantially constant pressure and said element having associated therewith yielding means substantially exactly neutralizing the effect of the pressure on said another area.

7. In a regulating device, in combination, means providing a passage for conducting pressure fluid, means associated with said passage for producing a differential in pressure at different points along the same, means for supplying pressure fluid to said passage, means for controlling the flow of pressure fluid through said last mentioned means including a valve, means for determining the position of said valve including a member having two pressure areas facing in one direction and an oppositely directed pressure area equal to the sum of said two areas, means for subjecting one of said two areas to atmospheric pressure, means for connecting the other of said two areas to the high pressure side of said differential pressure producing means, means for subjecting said oppositely directed area to the pressure at the low pressure side of said differential pressure producing means, said pressure areas last mentioned being inversely proportional to the absolute pressures to which they are subjected, and means for subjecting said member to a force for balancing the pressure on the latter produced by atmospheric pressure.

8. In a regulating device, in combination, means providing a passage for conducting pressure fluid, means associated with said passage for producing a differential in pressure at different points along the same, means for supplying pressure fluid to said passage, means for controlling the flow of pressure fluid through said last mentioned means including a valve, means for determining the position of said valve including a member having two pressure areas directed in one direction of movement of said valve member and an oppositely directed pressure area, means for subjecting one of said areas at the first mentioned end to atmospheric pressure, means for subjecting the others of said areas to said differentially related pressures, and means for subjecting said member to a force for balancing the pressure on the latter produced by atmospheric pressure.

9. In a regulating device, in combination, means providing a passage for conducting pressure fluid, manually adjustable means for restricting by varying amounts the flow of fluid through said passage, means for supplying pressure fluid to said passage, a movable element having oppositely directed unequal pressure areas, means for subjecting said pressure areas to the absolute pressures at the opposite sides of said restricting means, said areas bearing to each other a ratio equal but inverse to the absolute pressures at the opposite sides of said restricting means, said element having in fixed relation thereto another area facing similarly to the smaller one of said unequal areas and subjected to ambient pressure, spring means for yieldingly opposing movement of said element by ambient pressure acting on said last mentioned area, to free said element from the effect of fluid pressure other than said absolute pressures, and valve means controlled by said element for regulating the flow of fluid through said fluid supply means.

10. In a regulating device, in combination, means providing a passage for conducting pressure fluid, means for restricting the flow of fluid through said passage, means for supplying pressure fluid to said passage, means for controlling the flow of pressure fluid from said last mentioned means to said passage including a movable element having a plurality of pressure areas thereon facing in one of its directions of movement and further having an oppositely directed pressure area, means for subjecting one of said plurality of pressure areas to atmospheric pressure, means for subjecting the others of said pressure areas respectively to the pressures at opposite sides of said restricting means, said others of said pressure areas inversely proportional to the absolute pressures to which they are subjected, and means for subjecting said element to a force for balancing the pressure on the latter produced by atmospheric pressure.

11. In a flow-regulating device, in combination, means forming a passage for conducting fluid having a supply end and a delivery end, means between said supply end and said delivery end for restricting flow and creating a differential in pressure between the upstream and downstream sides of said flow-restricting means, and a device for controlling the supply of fluid to the supply end of said passage including means forming a conduit leading to the supply end of said passage and an element having a portion movable relative to said conduit to vary the flow therethrough, said device having, for moving the same to vary the flow past it, an area facing in a direction to provide under the action of fluid pressure thereon a force tending to move said element to provide for increased flow past the same, a smaller area facing in a direction to provide under the action of fluid pressure thereon a force tending to move said element to diminish flow past the same and a third area facing in said last mentioned direction and with said smaller area equalling said first mentioned area, means for effecting the subjection of said first mentioned area to the pressure at the downstream side of said flow-restricting means, means for subjecting said smaller area to the pressure at the upstream side of said flow-restricting means, and means including an evacuated bellows enclosing said third mentioned area for precluding said third mentioned area from influencing the movement of said device, the ratio of said first mentioned area to said smaller area being substantially the same as the ratio of the absolute pressure at the upstream side of said flow-restricting means to the absolute pressure at the downstream side of said flow-restricting means.

12. In a flow-regulating device, in combination, means forming a passage for conducting fluid having a supply end and a delivery end, means between said supply end and said delivery end for restricting flow and creating a differential in pressure between the upstream and downstream sides of said flow-restricting means, and a device for controlling the supply of fluid to the supply end of said passage including means forming a conduit leading to the supply end of said passage and an element having a portion movable relative to said conduit to vary the flow therethrough, said device having, for moving said element to vary the flow past the latter, an area facing in a direction to provide under the action of fluid pressure thereon a force tending to move said element to provide for increased flow past the same, a smaller area facing in a direction to provide under the action of fluid pressure thereon a force tending to move said element to diminish flow past the same and a third area facing in said last mentioned direction and with said smaller area equalling said first mentioned area, said first mentioned area being subjected to the pressure at the downstream side of said flow-restricting means and said smaller area being subjected to the pressure at the upstream side of said flow-restricting means, means for subjecting said third area to atmospheric pressure and means for precluding said third mentioned area from influencing the movement of said device including resilient means counterbalancing the force exerted by atmospheric pressure on said third area, the ratio of said first mentioned area to said smaller area being substantially the same as the ratio of the absolute pressure at the upstream side of said flow-restricting means to the absolute pressure at the downstream side thereof.

13. The combination defined in claim 5 in which said flow-restricting means is movable with said device.

14. The combination defined in claim 5 in which said flow-restricting means is adjustable.

15. The combination defined in claim 5 in which means is provided for adjustably limiting the movement of said element.

16. The combination defined in claim 5 in which means is provided for positively moving said element wholly to interrupt flow past the same.

17. The combination defined in claim 5, in which said third area is formed on a reduced plunger moving with said element.

18. The combination defined in claim 5, in which said first mentioned and smaller areas are formed on a plate connected to said element and in which said flow-restricting means is carried by said plate.

19. The combination defined in claim 12, in which said first mentioned and smaller areas are formed on a plate connected to said element, in which said flow-restricting means is carried by said plate, and in which said resilient means acts upon said plate.

20. In an apparatus of the class described, in combination, means providing a connection for communication with a source of gaseous fluid under pressure, means providing a connection for communication with a motor, and means arranged between said connections for conducting fluid from the first to the second and for governing the flow from one to the other including means for providing a restriction such as to cause the existence upon the flow of a predetermined volume in a unit of time past said restriction of a predetermined difference in pressure at the opposite sides of said restriction, valve means variably positionable to permit different volumes in a unit of time to flow through said conducting means, and means for controlling the position of said valve means including an element having oppositely facing unequal areas and a surface exposed to ambient pressure, said surface equal to the difference between said unequal areas, and the product of the smaller of said unequal areas multiplied by the absolute pressure at the supply side of said restriction providing means being equal to the product of the opposed larger area multiplied by the absolute pressure at the discharge side of said restriction providing means, when a predetermined flow past said restriction providing means is taking place, said element having associated therewith means for exerting thereon a force equal to the product of the area of said surface multiplied by the value in pounds absolute of the ambient pressure.

21. In a regulating device, in combination, means providing a connection for communication with a source of gaseous fluid under pressure, means providing a connection for communication with a motor, means between said connections providing a restriction such that a differential in pressure exists at opposite sides of said restriction during fluid flow between said connections, an element having oppositely facing surfaces, one subjected to the pressure downstream of such restriction, and the other subjected to the pressure at the side of the restriction nearer the first mentioned connection, means movable with said element for rendering the effective area of said second mentioned surface sufficiently less than the effective area of said first mentioned surface so that the ratio of said areas will be substantially the same as the inverse ratio of the absolute pressures at opposite sides of said restriction during the existence of a uniform flow rate through said regulating device, means forming a valve moving with said element and movable by the latter to vary the flow between said connections, said element having movable therewith a further surface exposed to ambient pressure and equal in area to the difference between the areas of said first mentioned surfaces, and means for subjecting said element to a pressure substantially equal to absolute ambient pressure multiplied by said third mentioned area, said last mentioned pressure directed oppositely to the force produced by ambient pressure on said area.

22. In an apparatus of the class described, in combination, means providing a connection for communication with a source of gaseous fluid under pressure, means providing a connection for communication with a motor, and means arranged between said connections for conducting fluid from the first to the second and for governing the flow from one to the other including means for providing a restriction such as to cause the existence upon the flow of a predetermined volume in a unit of time past said restriction of a predetermined difference in pressure at the opposite sides of said restriction, balanced valve means variably positionable to permit different volumes per unit of time to flow through said conducting means, and means for controlling the position of said balanced valve means including an element having associated therewith means for providing on its oppositely facing surfaces effective areas respectively subjected to the pressure at the supply side and at the discharge side of said means providing a restriction and respectively having the ratio of their areas inversely proportional to the pressures at the opposite sides of said restriction, said balanced valve means under the action of the fluid of which it controls the flow exerting no pressure in either of the directions in which said surfaces face.

23. In a regulating device, in combination, means providing a bore, fluid supply means communicating with said bore at a point between the ends of the latter, fluid discharge means communicating with said bore at a point spaced longitudinally from said fluid means, said fluid discharge means having an intake end and a discharge end and, between said ends, a flow restricting device for causing a differential in pressure between the opposite sides thereof, means for restricting the flow of fluid from said fluid supply means through said bore to said fluid discharge means including a piston reciprocable in said bore and having oppositely directed unequal pressure areas, means for subjecting the smaller of said pressure areas to the absolute pressure at the intake end of said fluid discharge means, means for subjecting the larger of said pressure areas to the absolute pressure at the discharge end of said fluid discharge means, the ratio of said areas to each other the same as but inverse to the ratio of the absolute pressures to which they are subjected, said piston having therein a groove for connecting said fluid supply and discharge means in communication with each other, said groove communicating with said fluid supply means in varying the degrees depending on the position of said piston.

24. In an apparatus of the class described, in combination, means providing a connection for communication with a source of gaseous fluid under pressure, means providing a connection for communication with a motor, and means arranged between said connections for conducting fluid from the first to the second and for governing the flow from one to the other including means for providing a restriction such as to cause the existence upon the flow of a predetermined volume in a unit of time past said restriction of a predetermined difference in pressure at the opposite sides of said restriction, valve means variably positionable to permit different volumes in a unit of time to flow through said conducting means, and means for controlling the position of said valve means including a chamber having therein an element having at its opposite sides opposed, equal, annular areas and at one side a central area, the annular area and the central area at said last mentioned side subjected to the pressure at the discharge side of said restriction providing means, and said equal opposite annular area subjected to the pressure at the supply side of said restriction providing means, said last mentioned side of said element having associated therewith a portion extending to the outside of said chamber and of like cross sectional area with said central area and subjected to ambient pressure, and means for exerting on said element, in the direction in which the pressure on the central area acts, a force equal to the cross sectional area of said portion multiplied by ambient pressure.

ROBERT ANTHONY McCALLUM.

References Cited in the file of this patent

UNITED STATES PATENTS

| Number | Name | Date |
|---|---|---|
| 598,935 | Jewell | Feb. 15, 1898 |
| 750,752 | Cole | Jan. 26, 1904 |
| 991,641 | Plantinga | May 9, 1911 |
| 1,699,676 | Rush | Jan. 22, 1929 |
| 1,993,527 | Mears | Mar. 5, 1935 |
| 2,069,022 | Sisk | Jan. 26, 1937 |
| 2,255,787 | Kendrick | Sept. 16, 1941 |
| 2,258,758 | Haultain | Oct. 14, 1941 |

FOREIGN PATENTS

| Number | Country | Date |
|---|---|---|
| 326,647 | Italy | of 1935 |